(12) United States Patent
Ebata et al.

(10) Patent No.: US 9,523,409 B2
(45) Date of Patent: Dec. 20, 2016

(54) TORQUE FLUCTUATION ABSORBING APPARATUS

(75) Inventors: Masaru Ebata, Chita (JP); Tomohiro Saeki, Anjo (JP); Tsutomu Sekine, Kariya (JP); Masakazu Kamiya, Toyoake (JP); Ulrich Rohs, Dueren (DE)

(73) Assignees: AISIN SEIKI KABUSHIKI KAISHA, Kariya-Shi, Aichi (JP); ATESTEO GMBH, Alsdorf (DE)

( * ) Notice: Subject to any disclaimer, the term of this patent is extended or adjusted under 35 U.S.C. 154(b) by 426 days.

(21) Appl. No.: 13/980,841

(22) PCT Filed: Jan. 21, 2011

(86) PCT No.: PCT/JP2011/051678
§ 371 (c)(1),
(2), (4) Date: Jul. 19, 2013

(87) PCT Pub. No.: WO2012/098691
PCT Pub. Date: Jul. 26, 2012

(65) Prior Publication Data
US 2013/0298725 A1 Nov. 14, 2013

(51) Int. Cl.
*F16F 15/30* (2006.01)
*F16F 15/139* (2006.01)

(52) U.S. Cl.
CPC ........... *F16F 15/30* (2013.01); *F16F 15/1392* (2013.01); *Y10T 74/2131* (2015.01)

(58) Field of Classification Search
CPC .... F16F 15/30; F16F 15/1392; F16F 15/1305; F16F 15/305; F16F 15/315; F16F 15/3156; F16F 15/345; F16F 15/363; F16F 15/139; F16F 15/31; F16F 15/1395; F16F 15/1292; F16F 15/129; F16F 15/1215; Y10T 74/2131; Y10T 74/2121; Y10T 74/2125; Y10T 74/213; F16D 3/14
(Continued)

(56) References Cited

U.S. PATENT DOCUMENTS 1,739,947 A * 12/1929 Chilton ................. F16D 43/216
192/45.005
4,583,959 A 4/1986 Yoneda
(Continued)

FOREIGN PATENT DOCUMENTS

DE 100 17 688 A1 10/2001
DE 103 43 063 A1 5/2004
(Continued)

OTHER PUBLICATIONS

International Search Report (PCT/ISA/210) issued on Oct. 7, 2011, by the European Patent Office as the International Searching Authority for International Application No. PCT/JP2011/051678.
(Continued)

*Primary Examiner* — Thomas Diaz
(74) *Attorney, Agent, or Firm* — Buchanan Ingersoll & Rooney PC

(57) ABSTRACT

A torque fluctuation absorbing apparatus comprises a first plate member, a second plate member disposed at a position axially offset from the first plate member, an intermediate plate member that is disposed between the first plate member and the second plate member and has a frictional sliding surface mating with the second plate member, rolling elements disposed so as to roll between the intermediate plate member and the first plate member, and resilient member that allows the intermediate plate member and the first plate member to rotate relative to each other. The intermediate plate member and the first plate member have acting sections on a surface whereon at least one of the rolling
(Continued)

elements rolls, the acting sections press the intermediate plate member against the second plate member by a relative rotation between the intermediate plate member and the first plate member.

27 Claims, 6 Drawing Sheets

(58) Field of Classification Search
USPC .............................................. 464/68.3–68.5
See application file for complete search history.

(56) References Cited

U.S. PATENT DOCUMENTS

| | | | |
|---|---|---|---|
| 5,454,459 A | 10/1995 | Sadakari et al. | |
| 6,446,780 B1 * | 9/2002 | Herbst | F16F 15/1238 192/213.22 |
| 2003/0178757 A1 | 9/2003 | Rohs et al. | |
| 2006/0009295 A1 | 1/2006 | Song et al. | |
| 2008/0078646 A1 | 4/2008 | Ebata | |
| 2008/0210049 A1 | 9/2008 | Rohs | |

FOREIGN PATENT DOCUMENTS

| | | |
|---|---|---|
| EP | 1 780 442 A2 | 5/2007 |
| FR | 1 320 363 A | 3/1963 |
| GB | 2 160 296 A | 12/1985 |
| JP | 6-147273 A | 5/1994 |
| JP | 7-54924 A | 2/1995 |

OTHER PUBLICATIONS

Written Opinion (PCT/ISA/237) issued on Oct. 7, 2011, by the European Patent Office as the International Searching Authority for International Application No. PCT/JP2011/051678.

* cited by examiner

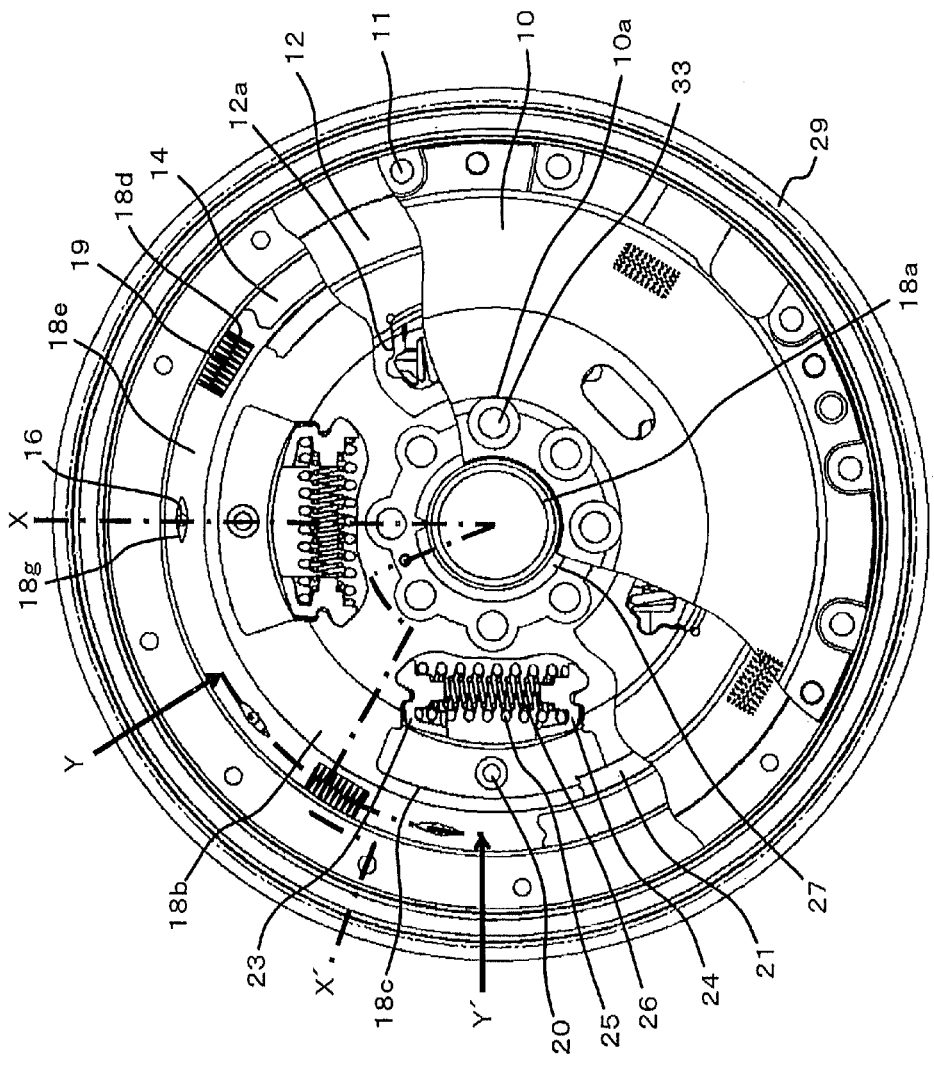
FIG.1 (EXEMPLARY EMBODIMENT 1)

FIG.2 (EXEMPLARY EMBODIMENT 1) X-X'
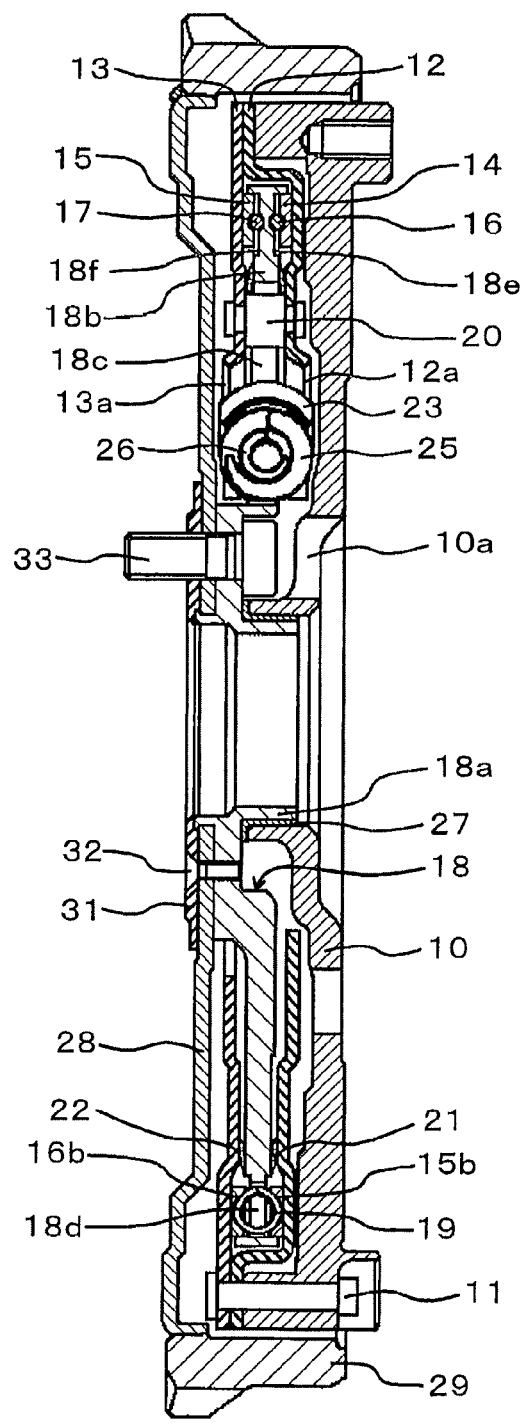

FIG.3A (EXEMPLARY EMBODIMENT 1) Y-Y'
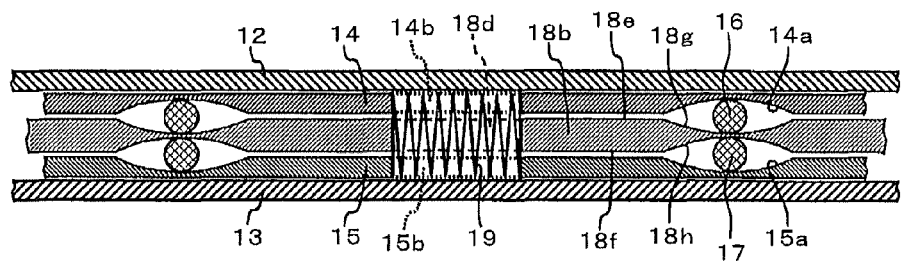
FIG.3B
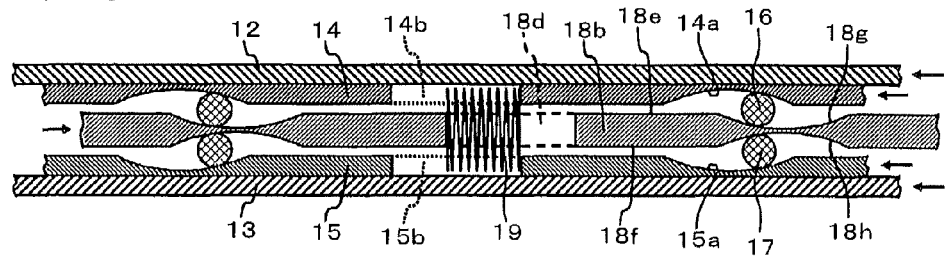
FIG.4 (EXEMPLARY EMBODIMENT 2) Y-Y'
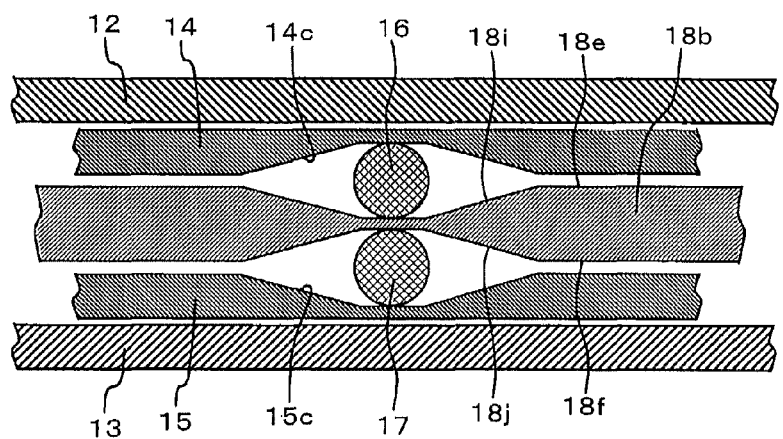

(EXEMPLARY EMBODIMENT 5)
Y-Y'

(EXEMPLARY EMBODIMENT 6)

(EXEMPLARY EMBODIMENT 6)
Z-Z'

TORQUE FLUCTUATION ABSORBING APPARATUS

TECHNICAL

The present invention relates to a torque fluctuation absorbing apparatus, and particularly to a torque fluctuation absorbing apparatus that absorbs sudden fluctuations in torque by generating great frictional resistance when two plates rotate relative to each other.

BACKGROUND

A torque fluctuation absorbing apparatus is disposed, for example, in a power transmission path between an engine and a reduction gear unit, so as to absorb (suppress) fluctuations in torque between the engine and the reduction gear unit. Among the torque fluctuation absorbing apparatuses is one that comprises a damper section (mechanism) which undergoes torsional motion when subjected to a fluctuation in torque and absorbs (suppresses) the fluctuation in torque through elastic force exerted by a coil spring disposed between a drive plate and a driven plate, and a hysteresis section (mechanism) which absorbs (suppresses) the fluctuations in torque by means of frictional force (hysteresis torque) exerted by a thrust member (frictional member) disposed between the drive plate and the driven plate. In some of the torque fluctuation absorbing apparatuses of the prior art, the hysteresis section (mechanism) absorbs sudden fluctuations in torque by generating a great frictional resistance when the drive plate and the driven plate rotate relative to each other.

For example, Patent Document 1 discloses a torque fluctuation absorbing apparatus that absorbs sudden fluctuations in torque when the drive plate and the driven plate rotate relative to each other, by increasing the pressure of a viscous fluid contained in a space between a pair of L-shaped thrust plates which are unable to rotate relative to the driven disk, so as to put the thrust plates into pressed contact with the driven disk, thereby generating a sliding resistance.

Patent Document 2 discloses a torque fluctuation absorbing apparatus that has a tapered force conversion section, where a wedge-shaped portion is driven to slide into a space between the tapered portion and a cylindrical portion, so as to generate a load that presses against the cylindrical portion disposed on an inner circumference and an outer circumference, thereby forcing a frictional member against the cylindrical portion by means of the load and generating frictional resistance (braking force).

[Patent Document 1]
Japanese Unexamined Kokai Patent Publication No. 6-147273A
[Patent Document 2]
German Patent Publication No. 10343063A (FIGS. 15-17)

SUMMARY

The entire disclosures disclosed in Patent Documents 1 and 2 mentioned above are incorporated by reference thereto in this application. The analysis described below is given by the present invention.

The torque fluctuation absorbing apparatus of Patent Document 1 has a problem of great change in hysteresis due to temperature, because the viscous fluid is used.

The torque fluctuation absorbing apparatus of Patent Document 2 has a problem that frictional sliding motion in the tapered portion that serves as a force conversion section causes a loss in the load on the frictional sliding surface of the cylindrical section, thus decreasing the sliding torque. The torque fluctuation absorbing apparatus of Patent Document also has a problem that the braking is effected asymmetrically with respect to an axis of rotation and therefore a bearing is subjected to unevenly distributed frictional force that may deform or damage the bearing.

It is a major object of the present invention to provide a torque fluctuation absorbing apparatus that is capable of absorbing sudden fluctuations in torque while suppressing the loss in load on the frictional sliding surface and suppressing uneven distribution of friction.

According to one aspect of the present invention, there is provided a torque fluctuation absorbing apparatus that absorbs sudden fluctuations in torque by generating great frictional resistance when two plates rotate relative to each other. The torque fluctuation absorbing apparatus comprises a first plate member; a second plate member disposed at a position offset from the first plate member in an axial direction; an intermediate plate member that is disposed between the first plate member and the second plate member and has a frictional sliding surface mating with the second plate member; rolling elements (bodies) disposed to be capable of rolling between the intermediate plate member and the first plate member; and at least one resilient member that allows the intermediate plate member and the first plate member to rotate relative to each other. The intermediate plate member and the first plate member have acting sections on a surface whereon at least one of the rolling elements rolls, the acting sections press the intermediate plate member against or toward the second plate member by a relative rotation between the intermediate plate member and the first plate member.

The meritorious effects of the present invention are summarized in the followings, however, without limitative intention. According to the present invention, no viscous fluid is used to generate great frictional force when the first plate member and the second plate member rotate relative to each other in the hysteresis section (mechanism), thus making it possible to generate hysteresis torque that is less influenced by the (change in) temperature. Also because the rolling elements roll on the acting section(s) when the intermediate plate member and the first plate member rotate relative to each other, hysteresis torque can be generated in the hysteresis section (mechanism) by utilizing the inertia force of the intermediate plate member efficiently (with less frictional loss). As a result, inertia of the first plate member and the second plate member can be lowered and the apparatus can be made more compact. Moreover, when the rolling elements are disposed at equal intervals in the circumferential direction, pressure on the frictional surface between the intermediate plate member and the second plate member can be evenly distributed so that hysteresis torque is generated evenly at different positions thereby elongating the service life of the apparatus.

BRIEF DESCRIPTION OF THE DRAWINGS

FIG. 1 is a partially cut-away plan view schematically showing a formulation of a torque fluctuation absorbing apparatus according to a First Exemplary Embodiment of the present invention.

FIG. 2 is a sectional view taken along line X-X' in FIG. 1 schematically showing the formulation of the torque fluctuation absorbing apparatus according to the First Exemplary Embodiment.

FIG. 3 is a sectional view taken along line Y-Y' in FIG. 1 schematically showing the formulation of the torque fluctuation absorbing apparatus according to the First Exemplary Embodiment.

FIG. 4 is a sectional view schematically showing a part of the formulation of the torque fluctuation absorbing apparatus according to a Second Exemplary Embodiment.

Figure 5:
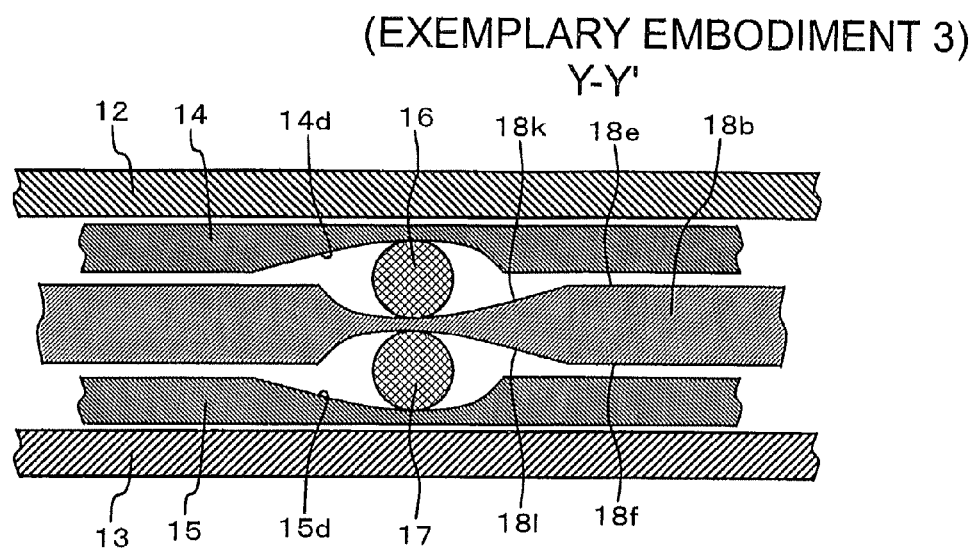
FIG. 5 is a sectional view schematically showing a part of the formulation of the torque fluctuation absorbing apparatus according to a Third Exemplary Embodiment.

In the following preferred modes of the invention will be illustrated for better understanding, however, without restrictive intentions to the disclosed modes. The symbols referred to the elements/components mentioned are solely intended for better understanding and not for the restrictive purpose to the referenced modes shown by the Drawings. It should be noted that a singular form may represent also plural form, as needed. The singular form is for convenience of illustrations, and not limited thereto.

PREFERRED MODES

The torque fluctuation absorbing apparatus according to one exemplary embodiment of the present invention comprises a first plate member (18b in FIG. 3), a second plate member (12 in FIG. 3) disposed at a position offset from the first plate member (18b in FIG. 3) in the axial direction, an intermediate plate member (14 in FIG. 3) that is disposed between the first plate member (18b in FIG. 3) and the second plate member (12 in FIG. 3) and has a frictional sliding surface mating with the second plate member (12 in FIG. 3), rolling elements (16 in FIG. 3) disposed to be capable of rolling between the intermediate plate member (14 in FIG. 3) and the first plate member (18a in FIG. 3) and a resilient member (19 in FIG. 3) that allows the intermediate plate member (14 in FIG. 3) and the first plate member (18b in FIG. 3) to rotate relative to each other. The intermediate plate member (14 in FIG. 3) and the first plate member (18b in FIG. 3) have acting sections (14a, 18g in FIG. 3) that press the intermediate plate member (14 in FIG. 3) against the second plate member (12 in FIG. 3) when the intermediate plate member (14 in FIG. 3) and the first plate member (18b in FIG. 3) rotate relative to each other on the surface whereon the rolling elements (16 in FIG. 3) roll (mode 1). More concretely, the intermediate plate member and the first plate member have acting sections on a surface whereon at least one of the rolling elements rolls, the acting sections press the intermediate plate member against or toward the second plate member by a relative rotation between the intermediate plate member and the first plate member.

The following modes are also possible.

It is preferable that the intermediate plate member and the first plate member are disposed in contact with or at a predetermined distance from each other, when the intermediate plate member is not pressed against the second plate member (mode 2).

The rolling elements have preferably a spherical, cylindrical or truncated conical shape (mode 3).

The acting section comprises (or is) preferably a recess formed in such a shape that the depth thereof is greatest at a center and decreases with an increasing distance from the center in a circumferential direction (mode 4).

The recess is preferably formed in such a shape that the width thereof is greatest at the center and decreases with an increasing distance from the center in the circumferential direction (mode 5).

The surface of the recess preferably has a warped or flat sloped surface (mode 6).

The sloped surface of the recess preferably has an inclination angle not less than 5 degrees and not larger than 40 degrees (mode 7).

The sloped surface of the recess is preferably formed so that the inclination angle is different between the forward and reverse sides in the circumferential direction (mode 8).

It is preferable that the resilient member deflects in accordance to relative speed or relative acceleration between the intermediate plate member and the second plate member, so as to allow the intermediate plate member and the second plate member to rotate relative to each other (mode 9).

It is preferable that the rolling elements and the acting sections are disposed at three or more positions at equal intervals along the circumference (mode 10).

It is preferable that grease or oil is disposed in a frictional sliding section between the second plate member and the intermediate plate member (mode 11).

It is preferable that a sealing member comprised (or is) disposed between the first plate member and the second plate member for sealing the frictional sliding section between the second plate member and the intermediate plate member (mode 12).

It is preferable that the sealing member comprises (or is) a Belleville (conical) spring that provides pressed contact with the first plate member at one end thereof and provides pressed contact with the second plate member at the other end thereof (mode 13).

It is preferable that a frictional material is disposed on the frictional sliding section of the second plate member or the intermediate plate member (mode 14).

It is preferable to provide a third plate member that rotates together with the second plate member, is disposed at a position offset from the first plate member toward a side opposite to the second plate member in an axial direction, and has a frictional sliding surface that mates with the first plate member (mode 15).

It is preferable to provide a third plate member that rotates together with the second plate member, and is disposed at a position offset from the first plate member toward a side opposite to the second plate member in the axial direction, a second intermediate plate member that is disposed between the first plate member and the third plate member and has a frictional sliding surface that mates with the third plate member, and (at least one) second rolling element disposed to be capable of rolling between the second intermediate plate member and the first plate member. At least one resilient member allows the second intermediate plate member and the first plate member to rotate relative to each other, and the second intermediate plate member and first plate member have second acting sections that press the intermediate plate member against the second plate member when the second intermediate plate member and the first plate member rotate relative to each other on a surface whereon the second rolling elements roll (mode 16).

It is preferable to provide a fourth plate member that rotates together with or while keeping a playing-clearance from the first plate member, is disposed at a position offset from the second plate member toward a side opposite to the first plate member in the axial direction, and has a frictional sliding surface that mates with the second plate member (mode 17).

It is preferable to provide a fifth plate member that rotates together with or while keeping a playing-clearance from the first plate member, is disposed at a position offset from the third plate member toward a side opposite to the first plate member in the axial direction, and has a frictional sliding surface that mates with the fourth plate member (mode 18).

It is preferable to provide a sixth plate member that rotates together with or while keeping a playing-clearance from the second plate member, is disposed at a position offset from the fourth plate member toward a side opposite to the second plate member in the axial direction, and has a frictional sliding surface that mates with the fourth plate member (mode 19).

It is preferable to provide a seventh plate member that rotates together with or while keeping a playing-clearance from the third plate member, is disposed at a position offset from the fifth plate member toward the side opposite to the third plate member in the axial direction, and has a frictional sliding surface that mates with the fifth plate member (mode 20).

It is preferable that a distance between the sixth plate member and the fourth plate member is set larger than a distance between the second plate member and the intermediate plate member (mode 21).

It is preferable that a distance between the seventh plate member and the fifth plate member is set larger than a distance between the third plate member and the second intermediate plate member (mode 22).

The first plate member may be disposed on a drive side, and the second plate member may be disposed on a driven side (mode 23)

The first plate member may be disposed on the driven side, and the second plate member may be disposed on the drive side (mode 24)

The acting section may comprise a taper. (mode 25)

The intermediate plate member may have the acting section on one side surface thereof in the axial direction and the fractional sliding surface on the other side surface thereof in the axial direction. (mode 26)

The resilient member may circumferentially contract. (mode 27)

First Exemplary Embodiment

The torque fluctuation absorbing apparatus according to a First Exemplary Embodiment of the present invention will be described below with reference to the accompanying drawings.

FIG. 1 is a partially cut-away plan view schematically showing the formulation of a torque fluctuation absorbing apparatus according to the First Exemplary Embodiment of the present invention. FIG. 2 is a sectional view taken along line X-X' in FIG. 1 schematically showing the formulation of the torque fluctuation absorbing apparatus according to First Exemplary Embodiment of the present invention. FIG. 3 is a sectional view taken along line Y-Y' in FIG. 1 schematically showing the formulation of the torque fluctuation absorbing apparatus according to First Exemplary Embodiment of the present invention. In FIG. 3, a flywheel 10 and a plate member 28 are omitted.

The torque fluctuation absorbing apparatus is mounted on an output shaft (not shown) of an engine (not shown), and absorbs (suppresses) fluctuations in toque generated by the engine (not shown) and a reduction gear unit (not shown). The torque fluctuation absorbing apparatus comprises a damper section (mechanism) that has torsion buffering function and absorbs (suppresses) the fluctuations in torque through an elastic force exerted by coil springs 25, 26 disposed between a flange portion 18b (drive plate) and side plates 12, 13 (driven plates), and a hysteresis section (mechanism) which absorbs (suppresses) the fluctuations in torque by means of frictional force (hysteresis torque) exerted by thrust members 14, 15 (frictional member) disposed between the flange portion 18b (drive plate) and the side plates 12, 13 (driven plate). While the flange portion 18b is used as the drive plate and the side plates 12, 13 are used as the driven plates in this case, alternatively the flange portion 18b may be used as the driven plate and the side plates 12, 13 may be used as the drive plates. The torque fluctuation absorbing apparatus comprises the flywheel 10, a rivet 11, the side plates 12, 13, the thrust plates 14, 15, the rolling elements 16, 17, a hub member 18, a coil spring 19, a stopper pin 20, Belleville (conical) springs (annular conical springs) 21, 22, seat members 23, 24, the coil (damping) springs 25, 26, a bearing 27, a plate member 28, an inertia body 29, a plate member 31 and screw bolts 32.

The flywheel 10 is an annular member connected to a rotating member (for example, input shaft of the reduction gear unit, not shown) disposed on the driven side. The flywheel 10 is disposed at a predetermined distance from the inertia body 29 on the side of inner circumference (i.e., radially internal) of the annular inertia body 29. The flywheel 10 has a protruding section that protrudes on the side of the plate member 28 located near the outer circumference, while the side plates 12, 13 are fastened by means of rivets 11 on the protruding section, so as to rotate together with the side plates 12, 13. The flywheel 10 makes contact with the side plate 12 in the vicinity of the hysteresis section (mechanism) where the thrust plate 14 and the side plate 12 make frictional sliding motion with each other. The flywheel 10 has through holes 10a that penetrate therethrough in the axial direction in a portion near the inner circumference. The through hole 10a is a hole for inserting a bolt 33 therethrough that is used to fasten the hub member 18 on a rotating member (not shown) on the drive side. The flywheel 10 that has a cylindrical portion on the end of inner circumference makes slidable contact with a bearing 27 on the inner circumference or at the distal end in the axial direction of the cylindrical portion, and is disposed to be capable of making relative rotation with the hub member 18 via the bearing 27.

The rivet 11 is a member used to fasten the side plates 12, 13 on the flywheel 10 in a portion where outer circumferential portions of the side plates 12, 13 overlap each other.

The side plate 12 is an annular plate member disposed mainly at a position offset toward the flywheel 10 side of the flange portion 18b, and forms a damper section (mechanism) and a hysteresis section (mechanism). The side plate 12 is disposed between the side plate 13 and the flywheel 10 in the outer circumferential section, and is fastened onto the flywheel 10 together with the side plate 13 by means of the rivets 11 (which may be replaced by bolts). The side plate 12 is formed so as to be located at a predetermined distance from the flange portion 18b in the inner circumferential portion. The side plate 12 makes pressed contact to be capable of making a frictional sliding motion with the thrust plate 14 when the thrust plate 14 is pressed against the flywheel 10 in the hysteresis section (mechanism), and makes contact with the flywheel 10 on a surface opposite to the surface of the pressure contact. A frictional material may be provided on a frictional sliding surface of the side plate 12. The side plate 12 is staked and caulked and fastened onto an end of the stopper pin 20 on the inner circumference side of the hysteresis section (mechanism). The side plate 12 has a plurality of windows 12a for housing the coil springs 25, 26 on the inner circumference side where it is staked and caulked and fastened onto an end of the stopper pin 20. The windows 12a make contact releasably with seat members 23, 24 that support ends of the coil springs 25, 26.

The side plate 13 is an annular plate member disposed mainly at a position offset toward the plate member 28 side of the flange portion 18b, and forms the damper section (mechanism) and the hysteresis section (mechanism). The side plate 13 is disposed on the plate member 28 side of the side plate 13 in the outer circumferential section, and is fastened onto the flywheel 10 together with the side plate 12 by the rivet 11 (which may be replaced by a bolt). The side plate 13 is formed so as to be located at a predetermined distance from the flange portion 18b in the inner circumferential portion. The side plate 13 makes a pressed contact to be capable of making frictional sliding motion with a thrust plate 15 when the thrust plate 15 is pressed against the plate member 28 in the hysteresis section (mechanism). A frictional material may be provided on a frictional sliding surface of the side plate 13. The side plate 13 is staked and caulked and fastened onto the other end of the stopper pin 20 on the inner circumference side of the hysteresis section (mechanism). The side plate 13 has a plurality of windows 12a for housing the coil springs 25, 26 on the inner circumference side of the staked and caulked portion with the stopper pin 20. The windows 12a make contact releasably with the seat members 23, 24 that support ends of the coil springs 25, 26.

The thrust plate 14 is an annular plate member disposed between the flange portion 18b and the side plate 12, and forms the hysteresis section (mechanism). The thrust plate 14 is inserted so as to be capable of moving in the axial direction via the rolling element 16 in a groove 18e of the flange portion 18b, and is disposed at a predetermined distance (playing-clearance) from the surface of the groove 18e in the radial direction. The thrust plate 14 has a recess 14a that partially accommodates the rolling element (roller) at a position that corresponds to a recess 18g of the flange portion 18b. The recess 14a serves as a rolling surface of the rolling element 16. The recess 14a is formed so as, when the thrust plate 14 and the flange portion 18b rotate relative to each other, to press the thrust plate 14 against the side plate 12 by the relative rotation between the thrust plate 14 and the flange portion 18b in accordance to the relative speed or relative acceleration through the interaction of the flange portion 18b with the recess 18g via the rolling element 16, so that hysteresis is generated between the thrust plate 14 and the side plate 12 by the thrust load. The recess 14a is formed in such a shape as depth and width thereof are greatest at the center while these parameters decrease with increase in the distance from the center in the circumferential direction to make the recess shallower and the recess-gap narrower. Surface of the recess 14a comprises (or is) an inclined surface or a taper (with an angle from 5 to 40 degrees, for instance) of warped shape (for example, a shape of a single radius of curvature, or a shape of having radius of curvature that increases with increasing distance from the center of recess in the circumferential direction). The recess 14a has a symmetrical shape with the same shapes on both sides in the circumferential direction, with respect to a line running through the center of the recess 14a in the radial direction. The thrust plate 14 may be either always in contact with the side plate 12, or located at a distance (with a playing-clearance of 0 to 2 mm) from the side plate 12 when it is not thrust. That is to say, the thrust plate 14 has the recess 14a on the flange portion 18b side surface thereof in the axial direction (i.e., on the lower surface thereof in the top-to-bottom direction in FIG. 3A) and the frictional sliding surface that can slide on the side plate 12 on the side plate 12 side surface thereof in the axial direction (i.e., on the upper surface thereof in the top-to-bottom direction in FIG. 3A) The thrust plate 14 may have a frictional material (not shown) provided on the frictional sliding surface. The thrust plate 14 has a plurality of windows 14b for housing the coil spring 19 at a position that corresponds to the window 18d of the flange portion 18b. The windows 14b allow contact releasably with ends of the coil spring 19.

The thrust plate 15 is an annular member disposed between the flange portion 18b and the side plate 13, and forms the hysteresis section (mechanism). The thrust plate 15 is inserted so as to be capable of moving in the axial direction via the rolling element 17 in a groove 18f of the flange portion 18b, and is disposed at a predetermined distance (playing-clearance) from the surface of the groove 18f in the radial direction thereof. The thrust plate 15 has a recess 15a that partially accommodates the rolling element at a position that corresponds to a recess 18h of the flange portion 18b. The recess 15a serves as a rolling surface of the rolling element 17. The recess 15a is formed so as, when the thrust plate 15 and the flange portion 18b rotate relative to each other, to press the thrust plate 15 against the side plate 13 by the relative rotation between the thrust plate 15 and the flange portion 18b in accordance to relative speed or relative acceleration through interaction of the flange portion 18b with the recess 18h via the rolling element 17, so that hysteresis is generated between the thrust plate 15 and the side plate 13 by a thrust load exerted. The recess 15a is formed in such a shape that the depth and width thereof are greatest at the center and decrease with an increasing distance from the center to make the recess-gap shallower and narrower toward the periphery thereof. Surface of the recess 15a comprises (or is) an inclined surface or a taper (with an angle generally from 5 to 40 degrees, e.g.) of a warped shape (for example, a shape of a single radius of curvature, or a shape of having radius of curvature that increases with the increasing distance from the center in the circumferential direction). The recess 15a has a symmetrical shape with the same shapes on both sides in the circumferential direction, with respect to a radial line running through the center of the recess 15a in the radial direction. The recess 15a may have a shape similar (or equivalent) to that of the recess 14a. The thrust plate 15 may be either always in contact with the side plate 13, or located at a distance (playing-clearance of e.g., 0 to 2 mm, approximately) from the side plate 13 when it is not thrust. That is to say, the thrust plate 15 has the recess 15a on the flange portion 18b side surface thereof in the axial direction (i.e., on the upper surface thereof in the top-to-bottom direction in FIG. 3A) and the frictional sliding surface that can slide on the side plate 13 on the side plate 13 side surface thereof in the axial direction (i.e., on the lower surface thereof in the top-to-bottom direction in FIG. 3A) The thrust plate 15 may have a frictional material (not shown) provided on the frictional sliding surface. The thrust plate 15 has a plurality of windows 15b each for housing the coil spring (or springs) 19 at a position that corresponds to the window 18d of the flange portion 18b. The windows 15b make contact releasably with the ends of the coil spring 19.

The rolling element 16 is a member that rolls in a space between (across) the recess 18g of the flange portion 18b and the recess 14a of the thrust plate 14, and forms the hysteresis section (mechanism). The rolling element 16 may be spherical (may also have cylindrical or truncated conical shape), but may also be formed in a cylindrical shape that corresponds to the shape of the recesses 18g, 14a. When the thrust plate 14 and the flange portion 18b rotate relative to each other, the rolling elements 16 move (ride) onto the sloped surface in the forward direction (or reverse direction) of the recess 18g of the flange portion 18b, and onto the sloped surface in the reverse direction (or forward direction) of the recess 14a of the thrust plate 14, so as to press the thrust plate 14 against the side plate 12. In the configuration shown in FIG. 1, four rolling elements 16 are disposed at equal intervals in the circumferential direction, although it would suffice to dispose at least three rolling elements 16 at equal intervals in the circumferential direction.

The rolling element 17 is a member that rolls in a space between the recess 18h of the flange portion 18b and the recess 15a of the thrust plate 15, and forms the hysteresis section (mechanism). The rolling element 17 may be spherical (may also have cylindrical or truncated conical shape), but may also be formed in a cylindrical shape that corresponds to the shape of the recesses 18h, 15a. When the thrust plate 15 and the flange portion 18b rotate relative to each other, the rolling elements 17 move (ride) onto the sloped surface in the forward direction (or reverse direction) of the recess 18h of the flange portion 18b, and onto the sloped surface in the reverse direction (or forward direction) of the recess 15a of the thrust plate 15, so as to press the thrust plate 15 against the side plate 13. In the configuration shown in FIG. 1, four rolling elements 17 are disposed at equal intervals in the circumferential direction, although it would suffice to dispose at least three rolling elements 17 at equal intervals in the circumferential direction.

The hub member 18 is an annular plate member connected to a rotating member (for example, output shaft of the engine, not shown) disposed on the drive side, and forms the damper section (mechanism) and the hysteresis section (mechanism). The hub member 18 has a cylindrical hub section 18a on the inner circumferential portion thereof. The hub section 18a is, on the outer circumferential surface thereof on the flywheel side thereof, disposed to be capable of making relative rotation with the flywheel 10 via a bearing 27. The hub member 18 has the flange (portion) 18b that radially extends from a predetermined position on the outer circumferential surface of the hub section 18a toward the outer circumference.

The flange portion 18b makes sliding contact with the bearing 27 on the surface thereof on the flywheel 10 side in the vicinity of the hub section 18a. The flange portion 18b is fastened onto a plate member 31 and a plate member 28 by means of screw bolts 32, and rotates in unison with the plate member 31 and the plate member 28. The flange portion 18b has a through hole(s) for inserting a bolt(s) 33 therethrough that is used to fasten onto a rotating member on the drive side. The flange portion 18b has a plurality of windows 18c for housing the coil springs 25, 26 on the outer circumference side of the through hole for the bolt 3. The windows 18c make contact releasably with seat members 23, 24 that support ends of the coil springs 25, 26. In the windows 18c, a stem portion of stopper pin 20 disposed between the side plates 12, 13 is inserted to be movable in the circumferential direction with a predetermined length on the outer circumference side of the coil springs 25, 26. The flange portion 18b has grooves 18e, 18f that correspond to the thrust plates 14, 15 formed in a portion on the radially outer circumference side of the window 18c. The thrust plate 14 is inserted so as to be capable of moving in the axial direction via the rolling elements 16 in the groove 18e, and the thrust plate 14 is disposed with a predetermined clearance (playing-clearance) in the radial direction. The groove 18e has the recess 18g that partially accommodates the rolling element 16 at a position that corresponds to the recess 14a of the thrust plate 14. The recess 18g is formed so as, when the thrust plate 14 and the flange portion 18b rotate relative to each other, to press the thrust plate 14 against the side plate 12 by the relative rotation between the thrust plate 14 and the flange portion 18b through interaction of the recess 14a of the thrust plate 14 with the rolling element 16. The recess 18g is formed in such a shape that depth and width thereof are greatest at the center and decrease with the increasing circumferential distance from the center to become shallower and narrower toward the circumferential end. Surface of the recess 18g comprises (or is) an inclined surface or a taper (with an angle from 5 to 40 degrees, e.g.) of warped shape (for example, a shape of a single radius of curvature, or a shape of having radius of curvature that increases with the increasing circumferential distance from the center). The recess 18g has a symmetrical shape with the same shapes on both sides in the circumferential direction, with respect to a radial line running through the center of the recess 18g in the radial direction. The thrust plate 15 is inserted so as to be capable of moving in the axial direction via the rolling elements 17 in the groove 18f, and the thrust plate 15 is disposed with a predetermined clearance (playing-clearance) in the radial direction. The groove 18f has a recess 18h that partially accommodates the rolling element 17 at a position that corresponds to the recess 15a of the thrust plate 15. The recess 18h is formed so as, when the thrust plate 15 and the flange portion 18b rotate relative to each other, to press the thrust plate 15 against the side plate 13 by the relative rotation between the thrust plate 15 and the flange portion 18b through interaction of the recess 15a of the thrust plate 15 with the rolling element 16. The recess 18h is formed in such a shape that depth and width thereof are greatest at the center and decrease with the increasing distance from the center in the circumferential direction to become shallower and narrower. Surface of the recess 18h comprise (or is) an inclined surface or taper (with an angle from 5 to 40 degrees) of warped shape (for example, a shape of a single radius of curvature, or a shape of having radius of curvature that increases with the increasing distance from the center in the circumferential direction). The recess 18h has a symmetrical shape with the same shapes on both sides in the circumferential direction, with respect to a line running through the center of the recess 18h in the radial direction. The recesses 18g, 18h have shapes similar to those of the recesses 14a, 15a. The flange portion 18b has a plurality of windows 18d each for housing the coil spring 19 at predetermined positions of the grooves 18e, 18f. The windows 18d make contact releasably with the end of the coil spring 19.

The coil spring 19 is a resilient member (or elastic body) that forms a hysteresis section (mechanism). The coil spring 19 allows the flange portion 18b and the thrust plates 14, 15 to rotate relative to each other. The coil spring 19 is housed in the windows 18d, 14b, 15b that are formed in the flange portion 18b and the thrust plates 14, 15 and, at both ends thereof, makes contact releasably with the ends in the circumferential direction of the windows 18d, 14b, 15b, either directly or indirectly. The coil spring 19 circumferentially contracts (i.e., contracts in the horizontal direction in FIG. 3) when the flange portion 18b and the thrust plates 14, 15 rotate relative to each other so as to compensate for a difference in the rotation between the flange portion 18b and the thrust plates 14, 15. The coil spring 19 is set so as to deflect when the relative angular acceleration between the flange portion 18b and the thrust plates 14, 15 increases beyond a predetermined value.

The stopper pin 20 is a member for fastening the side plates 12, 13 at a given distance from each other, and regulating the deflection of the coil springs 25, 26 in the circumferential direction. The side plate 12 is staked and caulked and fastened onto one end of the stopper pin 20, and the side plate 13 is staked and caulked and fastened onto the other end, while the stopper pin 20 has a stem portion between the side plates 12, 13 having a diameter larger than that of the staked portion. The stem portion of the stopper pin 20 is inserted through the window 18c of the flange portion 18b, and is capable of moving in the circumferential direction within the window 18c.

The Belleville (conical) spring 21 is a sealing member that seals the space between the side plates 12, 13 in the hysteresis section (mechanism) at the positions of the window 18c and the groove 18e of the flange portion 18b. It is effective when there is grease or oil provided in the frictional sliding section between the side plates 12, 13 and the thrust plates 14, 15 in the space between the side plates 12, 13. The Belleville (conical) spring 21 makes a pressure contact with the side plate 12 on the end of inner circumference thereof, and makes a pressure contact with the flange portion 18b on the end of outer circumference thereof.

The Belleville (conical) spring 22 is a sealing member that seals certain space between the side plates 12, 13 in the hysteresis section (mechanism) at the positions of the window 18c and the groove 18f of the flange portion 18b. It is effective when there is grease or oil provided in the frictional sliding section between the side plates 12, 13 and the thrust plates 14, 15 in the space between the side plates 12, 13. The Belleville (conical) spring 22 makes a pressure contact with the side plate 13 on the end of inner circumference thereof, and makes a pressure contact with the flange portion 18b on the end of radially outer circumference thereof.

Seat members 23, 24 make up a damper section (mechanism). The seat members 23, 24 are accommodated in the windows 12a, 13a, 18c formed in the side plates 12, 13 and the flange portion 18b, and are disposed between the windows 12a, 13a, 18c and the ends of the coil springs 25, 26.

The coil springs 25, 26 make up the damper section (mechanism), and are formed from an elastic (resilient) material (damping member). The coil springs 25, 26 are accommodated in the windows 12a, 13a; 18c formed in the side plates 12, 13 and the flange portion 18b, and make contact with (retained by) the seat members 23, 24 disposed on both ends of the windows. The coil springs 25, 26 contract when the side plates 12, 13 and the flange portion 18b rotate relative to each other, so as to absorb the fluctuation in torque caused by a difference in rotation between the side plates 12, 13 and the hub member 18. The coil spring 26 is a coil spring of a small diameter disposed on the inner circumference side of the coil spring 25.

The bearing 27 is a member that supports the hub section 18a of the hub member 18 and the flywheel 10 so as to be rotatable relative to each other. The bearing 27 is disposed so as to allow relative rotation also between the flywheel 10 and the flange portion 18b of the hub member 18.

The plate member 28 is a major annular plate member. The plate member 28 is fastened onto the flange portion 18b of the hub member 18 on the inner circumference along with a plate member 31 by means of screw bolts 32. The plate member has an inertia member 29 fastened on the outer circumference thereof by welding or the like.

The inertia body 29 is a cylindrical or annular member that gives inertia to a rotating member (not shown) on the drive side. The inertia body 29 is disposed at a predetermined distance (clearance) on the outer circumference side of the flywheel 10 and the side plates 12, 13, and is fastened on the outer circumference of the plate member 28 by welding or the like. The inertia body 29 also has a gear formed on the outer circumference thereof for meshing with a gear connected to a starter motor.

The plate member 31 is an auxiliary annular plate member for fastening the plate member 28 onto the flange portion 18b by means of the screw bolts 32.

The screw bolt 32 is a member for fastening the plate members 28, 31 onto the flange portion 18b of the hub member 18.

The bolt 33 is a member for fastening the hub member 18 onto a rotating member (not shown) on the drive side. The bolt 33 is passed through the through holes formed in the hub member 18 and the plate members 28, 32, and is screwed into the rotating member on the drive side.

Now the operation of the hysteresis section (mechanism) of the torque fluctuation absorbing apparatus according to First Exemplary Embodiment of the present invention will be described by making reference to the accompanying drawings.

With reference to FIG. 3A, in case there is no torsional motion between the side plates 12, 13 and the hub member 18, the coil spring 19 does not contract and the rolling elements 16, 17 are positioned at deep positions at the centers of the recess 14a, 15a, 18g, 18h. As a result, the thrust plates 14, are not pressed against the side plates 12, 13, and therefore the frictional force (hysteresis torque) between the thrust plates 14, 15 and the side plates 12, 13 is not amplified. (i.e., remains at a small value)

With reference made to FIG. 3B, in case there is torsional motion generated between the side plates 12, 13 and the hub member 18, the coil spring 19 contracts due to the inertia of the thrust plates 14, 15, and the rolling elements 16, 17 move onto the sloped surface in the forward direction (or reverse direction) of the recesses 18g, 18h and onto the sloped surface in the reverse direction (or forward direction) of the recesses 14a, 15a, so as to press the thrust plates 14, against the side plates 12, 13, so that the thrust plates 14, 15 are caused to move (slide) by a friction with (relative to) the side plates 12, 13. The rolling elements 16, 17 further move onto shallow positions of a sloped surface in the forward direction (or reverse direction) of the recesses 18g, 18h and a sloped surface in the reverse direction (or forward direction) of the recesses 14a, 15a, so as to press the thrust plates 14, 15 with a greater force against the side plates 12, 13, so that the frictional force (hysteresis torque) between the thrust plates 14, 15 and the side plates 12, 13 is amplified. During the rolling elements 16, 17 move onto the sloped surface in the forward direction (or reverse direction) of the recesses 18g, 18h and onto the sloped surface in the reverse direction (or forward direction) of the recesses 14a, 15a, the thrust plates 14, 15 and the flange portion 18b rotate relative to each other while the rolling elements 16, 17 are rolling, and therefore friction loss between the thrust plates 14, 15 and the flange portion 18b is small.

According to First Exemplary Embodiment, hysteresis torque free of the influence of the temperature can be generated since viscous fluid is not used for generating large frictional resistance when the flange portion 18*b* (drive plate) and the side plates 12, 13 (driven plate) rotate relative to each other in the hysteresis section (mechanism).

When the thrust plates 14, 15 and the flange portion 18*b* rotate relative to each other, since the rolling elements 16, 17 roll on the sloped surfaces of the recess 14*a*, 15*a*, 18*g*, 18*h*, hysteresis torque can be generated in the hysteresis section (mechanism) by utilizing the inertia force of the thrust plates 14, 15 efficiently (with less frictional loss). As a result, the inertia of the flange portion 18*b* (drive plate) and the side plates 12, 13 (driven plate) can be lowered and the apparatus can be made more compact.

Moreover, since the rolling elements 16, 17 are disposed at equal intervals in the circumferential direction, pressure on the frictional surface(s) between the thrust plates 14, 15 and the side plates 12, 13 is evenly distributed so that hysteresis torque is generated evenly at different positions thereby elongating the service life of the apparatus.

Furthermore, since the thrust plates 14, 15 are pressed against the side plates 12, 13 that are disposed in the axial direction when the thrust plates 14, 15 and the flange portion 18*b* rotate relative to each other, the flywheel 10 makes uniform contact with the bearing 27, so that the frictional surface between the flywheel 10 and the bearing 27 wears evenly, thus reducing the burden on the bearing 27.

Second Exemplary Embodiment

Now the torque fluctuation absorbing apparatus according to Second Exemplary Embodiment of the present invention will be described by making reference to the accompanying drawings. FIG. 4 is a sectional view schematically showing a part of the formulation of the torque fluctuation absorbing apparatus according to Second Exemplary Embodiment of the present invention. FIG. 4 corresponds to a part of the section along line Y-Y' in FIG. 1 (vicinity of the rolling element 16).

In First Exemplary Embodiment, surfaces of the recesses (14*a*, 15*a* of FIG. 3) of the thrust plates (14, 15 of FIG. 3) and the recesses (18*g*, 18*h* of FIG. 3) of the flange portion (18*b* of FIG. 3) have warped shapes, although in Second Exemplary Embodiment, surfaces of the recesses 14*c*, 15*c* of the thrust plates 14, 15 and the recesses 18*i*, 18*j* of the flange portion 18*b* have flat tapered (sloped) shapes (or flat tapers). In other respect, the formulation is similar to that of First Exemplary Embodiment. According to Second Exemplary Embodiment, while effects similar to those of First Exemplary Embodiment can be achieved, the pattern of generating the frictional force (hysteresis torque) between the thrust plates 14, 15 and the side plates 12, 13 can be set in accordance to the design and specifications.

Third Exemplary Embodiment

Now the torque fluctuation absorbing apparatus according to Third Exemplary Embodiment of the present invention will be described by making reference to the accompanying drawings. FIG. 5 is a sectional view schematically showing a part of the formulation of the torque fluctuation absorbing apparatus according to Third Exemplary Embodiment of the present invention. FIG. 5 corresponds to a part of the section along line Y-Y' in FIG. 1 (vicinity of the rolling element 16).

In First Exemplary Embodiment, surfaces of the recesses (14*a*, 15*a* of FIG. 3) of the thrust plates (14, 15 of FIG. 3) and the recesses (18*g*, 18*h* of FIG. 3) of the flange portion (18*b* of FIG. 3) have symmetrical shapes with the same shapes on both sides in the circumferential direction, with respect to a radial line running through the center (deepest portion) of the recesses (14*a*, 15*a*, 18*g*, 18*h* of FIG. 3) in the radial direction, although in Third Exemplary Embodiment, surfaces of the recesses 14*d*, 15*d* of the thrust plates 14, 15 and the recesses 18*k*, 18*l* of the flange portion 18*b* have asymmetrical shapes with different shapes on both sides in the circumferential direction (shape in a forward direction and shape in a reverse direction are different), with respect to a radial line running through the center (deepest portion) of the recesses 14*d*, 15*d*, 18*k*, 18*l* in the radial direction. The recesses 14*d*, 15*d* have a steep inclination (or steep taper) from the center in the forward direction (toward right hand side in FIG. 5) and a gentle inclination (or gentle taper) from the center in the reverse direction (toward left hand side in FIG. 5). On the other hand, the recesses 18*k*, 18*l* have a gentle inclination (or gentle taper) in the forward direction (toward right hand side in FIG. 5) and a steep inclination (or steep taper) in the reverse direction (toward left hand side in FIG. 5). Shape of the recess 14*d* is point symmetry with the shape of the recess 18*k* (with respect to the center of the rolling element 16), and shape of the recess 15*d* is point symmetry with the shape of the recess 18*l* (with respect to the center of the rolling element 17). In other respect, the formulation is similar to that of First Exemplary Embodiment. Sloped surfaces of the recesses 14*d*, 15*d*, 18*k*, 18*l* are not restricted to warped shape and may be flat tapered surfaces.

According to Third Exemplary Embodiment, while effects similar to those of First Exemplary Embodiment can be achieved, the pattern of generating the frictional force (hysteresis torque) between the thrust plates 14, 15 and the side plates 12, 13 can be set in accordance to the design and specifications.

Forth Exemplary Embodiment

Now the torque fluctuation absorbing apparatus according to Forth Exemplary Embodiment of the present invention will be described by making reference to the accompanying drawings.

Figure 6:
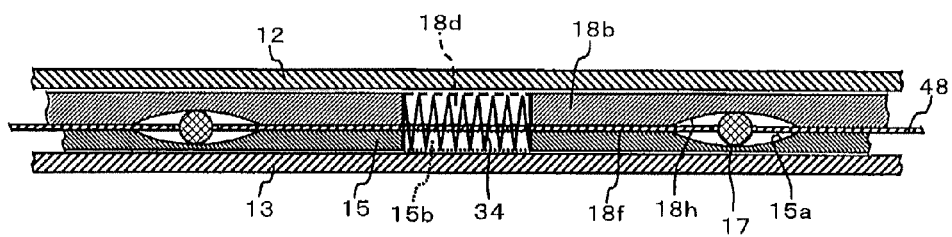
FIG. 6 is a sectional view schematically showing a part of the formulation of the torque fluctuation absorbing apparatus according to a Forth Exemplary Embodiment.

FIG. 6 is a sectional view schematically showing a part of the formulation of the torque fluctuation absorbing apparatus according to Forth Exemplary Embodiment of the present invention. FIG. 6 corresponds to the section along line Y-Y' in FIG. 1.

In First Exemplary Embodiment, the thrust plates (14, 15 of FIG. 3) are disposed both between the flange portion (18*b* of FIG. 3) and the side plate (12 of FIG. 3) and between the flange portion (18*b* of FIG. 3) and the side plate (13 of FIG. 3), although in Forth Exemplary Embodiment, the thrust plate 15 is disposed only on one side between the flange portion 18*b* and the side plate 13. The rolling elements 17 are disposed only between the recess 18*h* of the flange portion 18*b* and the recess 15*a* of the thrust plate 15. There is no recess (18*g* of FIG. 3) in the surface of the flange portion 18*b* on the side plate 12 side. A frictional material may be disposed on the surface of the flange portion 18*b* on the side plate 12 side or on the surface of the side plate 12. Housed in the windows 18*d*, 15*b* that are formed in the flange portion 18*b* and the thrust plate 15 respectively, is a coil spring 34 which can be accommodated between the side plates 12, 13. The coil spring 34 is set so as to circumferentially deflect or contract (i.e., deflect or contract in the horizontal direction in FIG. 6) when the relative angular acceleration between the flange portion 18*b* and the thrust plate 15 increases beyond a predetermined value. Such a formulation may also be employed as a thrust plate (corresponds to 15 of FIG. 3) is disposed only on one side between the flange portion 18*b* and the side plate 14. Also a retainer 48 may be provided to hold the rolling elements 17 between the flange portion 18*b* and the thrust plate 15 (the same applies to other Exemplary Embodiments).

According to Fourth Exemplary Embodiment, while effects similar to those of First Exemplary Embodiment can be achieved, length (thickness) in the axial direction can be made smaller than that in First Exemplary Embodiment, thus making it possible to make the apparatus more compact.

Fifth Exemplary Embodiment

Figure 7:
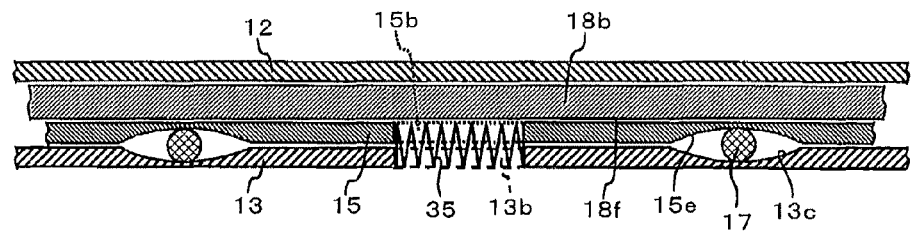
FIG. 7 is a sectional view schematically showing a part of the formulation of the torque fluctuation absorbing apparatus according to a Fifth Exemplary Embodiment.

The torque fluctuation absorbing apparatus according to Fifth Exemplary Embodiment of the present invention will be described below with reference to the accompanying drawings. FIG. 7 is a sectional view schematically showing a part of the formulation of the torque fluctuation absorbing apparatus according to Fifth Exemplary Embodiment of the present invention. FIG. 7 corresponds to the section along line Y-Y' in FIG. 1.

In the Fourth Exemplary Embodiment, the rolling elements (17 of FIG. 6) are disposed between the recess (18*h* of FIG. 6) of the flange portion (18*b* of FIG. 6) and the recess (15*a* of FIG. 6) of the thrust plate (15 of FIG. 6) so that the thrust plate (15 of FIG. 6) and the side plate (13 of FIG. 6) make frictional sliding motion, and the coil spring (34 of FIG. 6) is housed in the windows (18*d*, 15*b* of FIG. 6) that are formed in the flange portion (18*b* of FIG. 6) and the thrust plate (15 of FIG. 6).

Now in the Fifth Exemplary Embodiment, the recess 13*c* is formed in the surface of the side plate 13 on the thrust plate 15 side, a recess 15*e* is formed in the surface of the thrust plate 15 on the side plate 13 side, the rolling elements 17 are disposed between (across) the recess 13*c* of the side plate and the recess 15*e* of the thrust plate 15 so that the thrust plate 15 and the flange portion 18*b* undergo frictional sliding motion, and the coil spring 35 is housed in the windows 13*b*, 15*b* that are formed in the side plate 13 and the thrust plate 15, respectively. The recess 13 and the recess comprise a taper, respectively. Surface of the flange portion 18*b* on the side plate 12 side serves as a frictional sliding surface mating with the side plate 12. A frictional material may be provided on the frictional sliding surface of the flange portion 18*b* on the side plate 12 side or on the frictional sliding surface of the side plate 12. A frictional material may be provided on the frictional sliding surface of the flange portion 18*b* on the thrust plate 15 side or on the fritional sliding surface of the thrust plate 15. The thrust plate 15 has the recess 15*e* on the side plate 13 side surface thereof in the axial direction (i.e., on the lower side surface in the top-to-bottom direction in FIG. 7) and the frictional sliding surface on the flange portion 18*b* side surface thereof in the axial direction (i.e., on the upper side surface in the top-to-bottom direction in FIG. 7). The thrust plate 15 may be either always in contact with the flange portion 18*b*, or located at a distance (playing-clearance of, e.g., 0 to 2 mm, approximately) from the flange portion 18*b* when it is not thrust. The coil spring 35 is set so as to circumferentially deflect or contract (i.e., deflect or contract in the horizontal direction in FIG. 7) when the relative angular acceleration between the side plate 13 and the thrust plate 15 increases beyond a predetermined value.

According to Fifth Exemplary Embodiment, while effects similar to those of First Exemplary Embodiment can be achieved, thickness (width) in the axial direction can be made smaller than that in First Exemplary Embodiment, similarly to the case of Forth Exemplary Embodiment, thus making it possible to make the apparatus more compact.

Sixth Exemplary Embodiment

Figure 8:
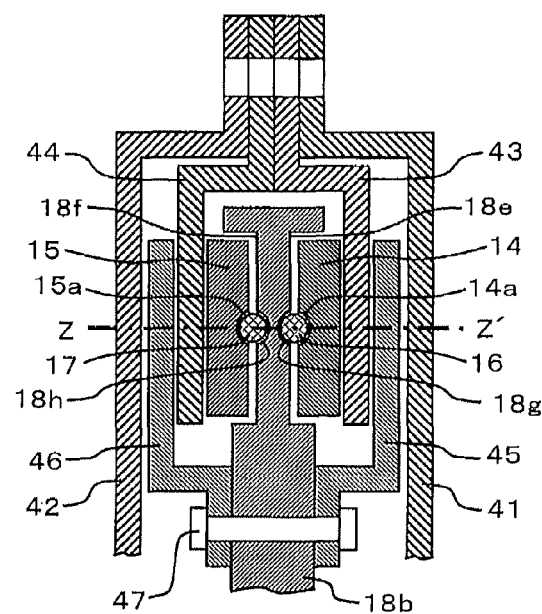
FIG. 8 is a sectional view schematically showing a part of the formulation of the torque fluctuation absorbing apparatus according to a Sixth Exemplary Embodiment.
Figure 9:
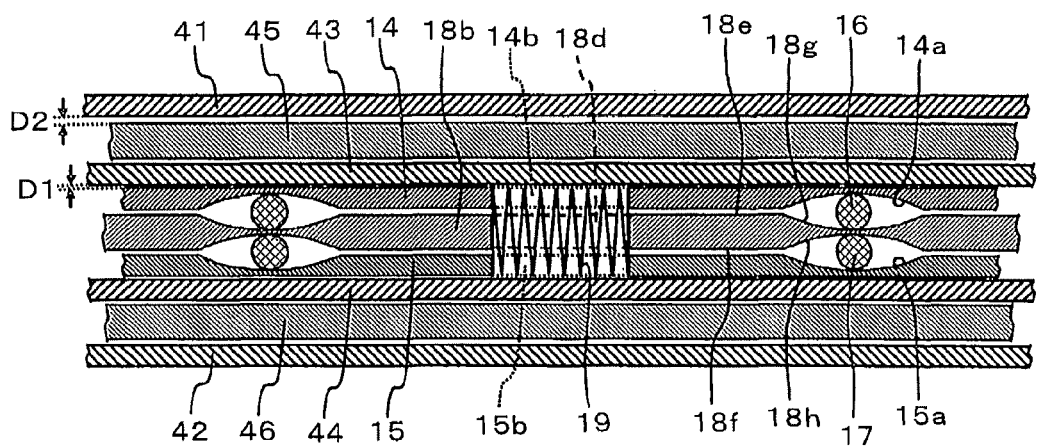
FIG. 9 is a partial sectional view taken along line Z-Z' in the circumferential direction of FIG. 8 schematically showing the formulation of the torque fluctuation absorbing apparatus according to the Sixth Exemplary Embodiment.

Now the torque fluctuation absorbing apparatus according to Sixth Exemplary Embodiment of the present invention will be described by making reference to the accompanying drawings. FIG. 8 is a sectional view schematically showing a part of the formulation of the torque fluctuation absorbing apparatus according to Sixth Exemplary Embodiment of the present invention. FIG. 9 is a partial sectional view taken along line Z-Z' in the circumferential direction of FIG. 8 schematically showing the formulation of the torque fluctuation absorbing apparatus according to Sixth Exemplary Embodiment of the present invention. FIG. 8 corresponds to a part of the cross section along line X-X' of FIG. 1.

First Exemplary Embodiment has such a formulation as the flange portion (18*b* of FIG. 2 and FIG. 3), the thrust plates (14, 15 of FIG. 2 and FIG. 3), the rolling elements (16, 17 of FIG. 2 and FIG. 3) and the coil spring (19 of FIG. 2 and FIG. 3) are disposed between the two side plates (12, 13 of FIG. 2 and FIG. 3), while the thrust plates (14, 15 of FIG. 2 and FIG. 3) and the side plates (12, 13 of FIG. 2 and FIG. 3) can make frictional sliding motion. In Sixth Exemplary Embodiment, in addition to the flange portion 18*b*, the thrust plates 14, 15, the rolling elements 16, 17 and the coil spring 19, the plate members 43, 44 and the plate members 45, 46 are also disposed between the two side plates 41, 42, while the thrust plates 14, and the plate members 43, 44 can make frictional sliding motion and the plate members 45, 46 can make frictional sliding motion with the plate members 43, 44 and the side plates 41, 42. In other respect, the formulation is similar to that of First Exemplary Embodiment.

The thrust plate 14 is an annular plate member disposed between the flange portion 18*b* and the (outer auxiliary) plate member 43, and forms the hysteresis section (mechanism). The thrust plate 14 may be either always in contact with the (outer auxiliary) plate member 43, or located at a distance (playing-clearance of, e.g., 0 to 2 mm, approximately) from the (outer auxiliary) plate member 43 when it is not thrust. The thrust plate 14 has the recess 14*a* on the flange portion 18*b* side surface thereof in the axial direction (i.e., on the left side surface thereof in the horizontal direction in FIG. 8) and the frictional sliding surface that can slide on the plate member 43 on the plate member 43 side surface thereof in the axial direction (i.e., on the right side surface thereof in the horizontal direction in FIG. 8). The thrust plate 14 may have a frictional material (not shown) provided on the frictional sliding surface mating with the (outer auxiliary) plate member 43. In other respect, the formulation of the thrust plate 14 is similar to that of the thrust plate (14 of FIG. 2 and FIG. 3) of First Exemplary Embodiment.

The thrust plate 15 is an annular member disposed between the flange portion 18*b* and the (outer auxiliary) plate member 44, and makes up the hysteresis section (mechanism). The thrust plate 15 may be either always in contact with the (outer auxiliary) plate member 44, or located at a distance (playing-clearance of, e.g., 0 to 2 mm, approximately) from the (outer auxiliary) plate member 44 when it is not thrust. The thrust plate 15 has the recess 15*a* on the flange portion 18*b* side surface thereof in the axial direction (i.e., on the right side surface thereof in the horizontal direction in FIG. 8) and the frictional sliding surface that can slide on the plate member 44 on the plate member 44 side surface thereof in the axial direction (i.e., on the left side surface thereof in the horizontal direction in FIG. 8). The thrust plate 15 may have a frictional material (not shown) provided on the frictional sliding surface with the (outer auxiliary) plate member 44. In other respect, the formulation of the thrust plate 15 is similar to that of the thrust plate (15 of FIG. 2 and FIG. 3) of First Exemplary Embodiment.

Formulation of the rolling elements 16, 17 is similar to that of the rolling elements (16, 17 of FIG. 2 and FIG. 3) of First Exemplary Embodiment.

Fastened onto the surface of the flange portion 18b on the side plate 42 side is an (extension) plate member 45 by means of rivets 47 in the portion on the inner circumference side of the grooves 18f, 18e, while an (extension) plate member 46 is fastened onto an opposite surface of the flange portion 18b, i.e., on the side plate 43 side. In other respect, formulation of the flange portion 18b is similar to that of the flange portion (18b of FIG. 2 and FIG. 3) of First Exemplary Embodiment.

Formulation of the coil spring 19 is similar to that of the coil spring (19 of FIG. 2 and FIG. 3) of First Exemplary Embodiment.

The side plate 41 is an annular plate member disposed mainly on the flywheel (which corresponds to 10 of FIG. 2) side of the flange portion 18b, and forms the damper section (mechanism) and the hysteresis section (mechanism). The side plate 41 is disposed between an (outer auxiliary) plate member 43 and the flywheel (which corresponds to 10 of FIG. 2) in the outer circumferential area, and is fastened onto the flywheel (which corresponds to 10 of FIG. 2) together with the side plate 42 and the (outer auxiliary) plate members 43, 44 by means of rivets (which correspond to 11 of FIG. 2, may be replaced by bolts). The side plate 41 is formed so as to be located at a predetermined distance from the (outer auxiliary) plate member 43 in the inner circumference area. The side plate 41 makes pressed contact capable of frictional sliding motion with the (extension) plate member 45 and makes contact with the flywheel (which corresponds to 10 of FIG. 2) on the surface opposite to the surface where the pressure contact is made, when the thrust plate 14 is pressed against the flywheel (which corresponds to 10 of FIG. 2) side in the hysteresis section (mechanism), as the (outer auxiliary) plate member 43 and the (extension) plate member 45 are also pressed. A frictional material may be provided on the frictional sliding surface of the side plate 41. In other respect, the formulation of the side plate 41 is similar to that of the side plate (12 of FIG. 2 and FIG. 3) of First Exemplary Embodiment.

The side plate 42 is an annular plate member disposed mainly on the plate member (which corresponds to 28 of FIG. 2) side of the flange portion 18b, and forms the damper section (mechanism) and the hysteresis section (mechanism). The side plate 42 is disposed on the plate member (which corresponds to 28 of FIG. 2) side of the (outer auxiliary) plate member 44 in the outer circumferential area, and is fastened onto the flywheel (which corresponds to 10 of FIG. 2) together with the (outer auxiliary) plate members 43, 44 and the side plate 42 by means of rivets (which correspond to 11 of FIG. 2, may be replaced by bolts). The side plate 42 is formed so as to be located at a predetermined distance from the (outer auxiliary) plate member 44 in the inner circumference area. The side plate 42 makes pressed contact to be capable of making frictional sliding motion with the (extension) plate member 46 when the thrust plate 15 is pressed against the plate member in the hysteresis section (mechanism), as the (outer auxiliary) plate members 44 and the (extension) plate members 46 are also pressed. A frictional material may be provided on the frictional sliding surface of the side plate 42. In other respect, the formulation of the side plate 42 is similar to that of the side plate (13 of FIG. 2 and FIG. 3) of First Exemplary Embodiment.

The (outer auxiliary) plate member 43 is an annular plate member disposed generally on the flywheel (which corresponds to 10 of FIG. 2) side of the flange portion 18b, and forms the hysteresis section (mechanism). The (outer auxiliary) plate member 43 is disposed generally between the (outer auxiliary) plate member 44 and the side plate 41 in the outer circumferential portion, and is fastened onto the flywheel (which corresponds to 10 of FIG. 2) together with the side plate 42, the (outer auxiliary) plate member 44 and the side plate 41 by means of rivets (which corresponds to 11 of FIG. 2, may be replaced by bolts). The (auxiliary) plate member 43 is formed so as to be located at a predetermined distance from the flange portion 18b in the inner circumference portion. The (outer auxiliary) plate member 43 makes pressed contact to be capable of making frictional sliding motion with the thrust plate 14 when the thrust plate is pressed against or toward the flywheel (which corresponds to 10 of FIG. 2) side in the hysteresis section (mechanism), and deforms so as to make pressed contact to be capable of making frictional sliding motion with the (extension) plate member 45 when pressed against the thrust plate 14 more strongly. A frictional material may be provided on the frictional sliding surface of the (outer auxiliary) plate member 43. While the (outer auxiliary) plate member 43 is shown in FIG. 8 as fastened onto the flywheel (which corresponds to 10 of FIG. 2) by means of the rivet (corresponds to 11 of FIG. 2), it may also be held with a playing-clearance from the side plate 41 in the rotating direction, for the purpose of making it easy to draw out of the state of frictional sliding.

The (outer auxiliary) plate member 44 is an annular plate member disposed generally on the plate member (which corresponds to 28 of FIG. 2) side of the flange portion 18b, and forms the hysteresis section (mechanism). The (outer auxiliary) plate member 44 is disposed generally between the (outer auxiliary) plate member 43 and the side plate 42 in the outer circumferential portion, and is fastened onto the flywheel (which corresponds to 10 of FIG. 2) together with the side plate 42, the (outer auxiliary) plate member 43 and the side plate 41 by means of rivets (which corresponds to 11 of FIG. 2, may be replaced by bolts). The (outer auxiliary) plate member 44 is formed so as to be located at a predetermined distance from the flange portion 18b in the inner circumference portion. The (outer auxiliary) plate member 44 makes pressed contact to be capable of making frictional sliding motion with the thrust plate 15 when the thrust plate 15 is pressed toward the plate member (which corresponds to 28 of FIG. 2) side in the hysteresis section (mechanism), and deforms so as to make pressed contact to be capable of making frictional sliding motion with the (extension) plate member 46 when pressed against the thrust plate 15 more strongly. A frictional material may be provided on the frictional sliding surface of the (outer auxiliary) plate member 44. While the (outer auxiliary) plate member 44 is shown in FIG. 8 as fastened onto the flywheel (which corresponds to 10 of FIG. 2) by means of rivets (which correspond to 11 of FIG. 2), it may also be held with a playing-clearance from the side plate 42 in the rotating direction, for the purpose of making it easy to draw out of the state of frictional sliding.

The (extension) plate member 45 (of the flange portion 18b) is an annular plate member disposed generally on the flywheel (which corresponds to 10 of FIG. 2) side of the flange portion 18b, and forms the hysteresis section (mechanism). The (extension) plate member 45 is fastened onto the flange portion 18b together with the (extension) plate member 46 by means of rivets 47 at the inner circumferential portion. The (extension) plate member 45 has an outer circumferential portion that extends between the side plate 41 and the (outer auxiliary) plate member 43, and is located at a predetermined distance from the side plate 41 and the (outer auxiliary) plate member 43. The (extension) plate member 45 makes pressed contact to be capable of making frictional sliding motion with the (outer auxiliary) plate member 43 when the thrust plate 14 is pressed toward the flywheel (which corresponds to 10 of FIG. 2) in the hysteresis section (mechanism), and deforms so as to make pressed contact to be capable of making frictional sliding motion with the side plate 41 when pressed against the thrust plate 14 more strongly. A frictional material may be provided on the frictional sliding surface of the (extension) plate member 45. While the (extension) plate member 45 is shown in FIG. 8 as fastened onto the flange 18a by means of the rivet 47, it may also be held with a playing-clearance from the flange portion 18b in the rotating direction, for the purpose of making it easy to draw out of the state of frictional sliding.

The (extension) plate member 46 is an annular plate member disposed generally on the plate member (which corresponds to 28 of FIG. 2) side of the flange portion 18b, and forms the hysteresis section (mechanism). The (extension) plate member 46 is fastened onto the flange portion 18b together with the (extension) plate member 45 by means of rivets 47. The (extension) plate member 46 has an outer circumferential portion that extends between the side plate 42 and the (outer auxiliary) plate member 44, and is located at a predetermined distance from the side plate 42 and the plate member 44. The (extension) plate member 46 makes pressed contact to be capable of making frictional sliding motion with the (outer auxiliary) plate member 44 when the thrust plate 15 is pressed toward the plate member (which corresponds to 28 of FIG. 2) side in the hysteresis section (mechanism), and deforms so as to make pressed contact to be capable of making frictional sliding motion also with the side plate 42 when pressed toward the thrust plate 15 more strongly. A frictional material may be provided on the frictional sliding surface of the (extension) plate member 46. While the (extension) plate member 46 is shown in FIG. 8 as fastened onto the flange 18a by means of rivets 47, it may also be held with a playing-clearance from the flange portion 18b in the rotating direction, for the purpose of making it easy to draw out of the state of frictional sliding.

The rivet 47 is a member for fastening the (extension) plate members 45, 46 onto the flange portion 18b on the inner circumference portions thereof.

It is preferable to set a distance D2 between the side plate 41 and the (extension) plate member 45 at a time when the thrust plate 14 is not pressed toward the side plate 41 larger than a distance D1 between the thrust plate 14 and the (outer auxiliary) plate member 43 at the time when the thrust plate 14 is not pressed toward the side plate 41 (refer to FIG. 9). This is for the purpose of making it possible to effect braking by frictional sliding in a stepwise manner. Similarly, it is preferable to set a distance (which corresponds to D2) between the side plate 42 and the (extension) plate member 46 at a time when the thrust plate 15 is not pressed toward the side plate 42 larger than a distance (which corresponds to D1) between the thrust plate 15 and the (outer auxiliary) plate member 44 at the time when the thrust plate 15 is not pressed toward the side plate 42.

According to Sixth Exemplary Embodiment, while effects similar to those of First Exemplary Embodiment can be achieved, it is made possible to effect braking by frictional sliding in a stepwise manner.

Within the scope of the entire disclosure (including the claims and drawings) of the present invention, it is possible to make alteration and modifications to modes or Exemplary Embodiments on the basis of the fundamental technical concept. Also various disclosed elements may be embodied in various combinations or selected within the scope of the claims of the present invention. In other words, it is understood that the present invention includes any variations and modifications which can be conceived by persons skilled in the art according to the entire disclosure including the claims, drawings and the technical concept of the present invention.

DESCRIPTION OF REFERENCE SYMBOLS

10 Flywheel
10a Through hole
11 Rivet
12 Side plate (second plate member)
12a Window
13 Side plate (third plate member)
13a, 13b Window
13c Recess (Acting section)
14, 15 Thrust plate (intermediate plate member)
14a, 15a Recess (Acting section)
14b, 15b Window
14c, 15c Recess (Acting section)
14d, 15d Recess (Acting section)
15e Recess (Acting section)
16 Rolling element
17 Rolling element (second rolling element)
18 Hub member (first plate member)
18a Hub section
18b Flange portion (of hub member)(first plate member)
18c, 18d Window 18e, 18f Groove 18g, 18h Recess (Acting section) 18i, 18j Recess (Acting section) 18k, 18l Recess (Acting section)
19 Coil spring (resilient member)
20 Stopper pin
21, 22 Belleville (conical) spring (sealing member)
23, 24 Seat member
25, 26 Coil spring (damping mechanism)
27 Bearing
28 Plate member
29 Inertia body
31 Plate member (central annular)
32 Screw
33 Bolt
34, 35 Coil spring (resilient member)
41 Side plate (sixth plate member)
42 Side plate (seventh plate member)
43 (outer auxiliary) Plate member (second plate member)
44 (outer auxiliary) Plate member (third plate member)
45 (extension) Plate member (fourth plate member)
46 (extension) Plate member (fifth plate member)
47 Rivet
48 Retainer sheet (for rolling elements)

The invention claimed is:
1. A torque fluctuation absorbing apparatus, comprising:
a first plate member;

a second plate member disposed at a position offset from the first plate member in an axial direction;

an intermediate plate member that is disposed between the first plate member and the second plate member and has a frictional sliding surface mating with the second plate member;

rolling elements disposed to be capable of rolling between the intermediate plate member and the first plate member;

at least one resilient member that allows the intermediate plate member and the first plate member to rotate relative to each other;

wherein the intermediate plate member and the first plate member have acting sections on a surface whereon at least one of the rolling elements rolls, the acting sections press the intermediate plate member against or toward the second plate member by a relative rotation between the intermediate plate member and the first plate member; and the resilient member contacts the intermediate plate member and the first plate member in a circumferential direction, and deforms in accordance with relative speed or relative acceleration between the intermediate plate member and the first plate member to permit relative rotation between the intermediate plate member and the first plate member.

2. The torque fluctuation absorbing apparatus according to claim 1, wherein the intermediate plate member and the first plate member are disposed in contact with or at a predetermined distance from each other, when the intermediate plate member is not pressed against or toward the second plate member.

3. The torque fluctuation absorbing apparatus according to claim 1, wherein the rolling elements have a spherical, cylindrical or truncated conical shape.

4. The torque fluctuation absorbing apparatus according to claim 1, wherein the acting section comprises a recess formed in such a shape that its depth is greatest at a center and decreases with an increasing distance from the center in a circumferential direction.

5. The torque fluctuation absorbing apparatus according to claim 4, wherein the recess is formed in such a shape that its width is greatest at the center and decreases with the increasing distance from the center in the circumferential direction.

6. The torque fluctuation absorbing apparatus according to claim 4, wherein the recess has a warped surface or flat sloped surface.

7. The torque fluctuation absorbing apparatus according to claim 6, wherein the relative rotation between the intermediate plate member and the first plate member occurs in a plane, and wherein the sloped surface of the recess has an inclination angle not less than 5 degrees and not larger than 40 degrees relative to the plane.

8. The torque fluctuation absorbing apparatus according to claim 6, wherein the sloped surface of the recess is formed so that the inclination angle is different between forward and reverse sides in the circumferential direction.

9. The torque fluctuation absorbing apparatus according to claim 1, wherein the resilient member deforms in accordance to relative speed or relative acceleration between the intermediate plate member and the second plate member, so as to allow the intermediate plate member and the second plate member to rotate relative to each other.

10. The torque fluctuation absorbing apparatus according to claim 1, wherein the rolling elements and the acting sections are disposed at three or more position at equal circumferential intervals.

11. The torque fluctuation absorbing apparatus according to claim 1, wherein grease or oil is disposed in a frictional sliding section between the second plate member and the intermediate plate member.

12. The torque fluctuation absorbing apparatus according to claim 11, wherein a sealing member is disposed between the first plate member and the second plate member for sealing the frictional sliding section between the second plate member and the intermediate plate member.

13. The torque fluctuation absorbing apparatus according to claim 12, wherein the sealing member comprises a Belleville (conical) spring that provides pressed contact with the first plate member at one end thereof and provides pressed contact with the second plate member at an other end thereof.

14. The torque fluctuation absorbing apparatus according to claim 1, wherein a frictional material is disposed on the frictional sliding section of the second plate member or the intermediate plate member.

15. The torque fluctuation absorbing apparatus according to claim 1, wherein said apparatus is provided with a third plate member that rotates together with the second plate member, and is disposed at a position offset from the first plate member toward a side opposite to the second plate member in an axial direction; said third plate member having a frictional sliding surface that mates with the first plate member.

16. The torque fluctuation absorbing apparatus according to claim 1, wherein said apparatus is provided with a third plate member that rotates together with the second plate member, and is disposed at a position offset from the first plate member toward a side opposite to the second plate member in the axial direction, a second intermediate plate member that is disposed between the first plate member and the third plate member and has a frictional sliding surface that mates with the third plate member, and at least one second rolling element disposed to be capable of rolling between the second intermediate plate member and the first plate member, wherein at least one resilient member allows the second intermediate plate member and the first plate member to rotate relative to each other, and the second intermediate plate member and first plate member have second acting sections that press the intermediate plate member against the second plate member when the second intermediate plate member and the first plate member rotate relative to each other on a surface whereon the second rolling elements roll.

17. The torque fluctuation absorbing apparatus according to claim 15, wherein said apparatus is provided with a fourth plate member that rotates together with or while keeping a playing-clearance from the first plate member and is disposed at a position offset from the second plate member toward a side opposite to the first plate member in the axial direction; said fourth plate member having a frictional sliding surface that mates with the second plate member.

18. The torque fluctuation absorbing apparatus according to claim 17, wherein said apparatus is provided with a fifth plate member that rotates together with or while keeping a playing-clearance from the first plate member, and is disposed at a position offset from the third plate member toward a side opposite to the first plate member in the axial direction; said fifth plate member having a frictional sliding surface that mates with the fourth plate member.

19. The torque fluctuation apparatus absorbing according to claim 18, wherein said apparatus is provided with a sixth plate member that rotates together with or while keeping a playing-clearance from the second plate member, and is disposed at a position offset from the fourth plate member toward a side opposite to the second plate member in the axial direction; said sixth plate member having a frictional sliding surface that mates with the fourth plate member.

20. The torque fluctuation absorbing apparatus according to claim 19, wherein said apparatus is provided with a seventh plate member that rotates together with or while keeping a playing-clearance from the third plate member, and is disposed at a position offset from the fifth plate member toward a side opposite to the third plate member in the axial direction; said seventh plate member having a frictional sliding surface that mates with the fifth plate member.

21. The torque fluctuation absorbing apparatus according to claim 19, wherein a distance between the sixth plate member and the fourth plate member is set larger than a distance between the second plate member and the intermediate plate member.

22. The torque fluctuation absorbing apparatus according to claim 20, wherein a distance between the seventh plate member and the fifth plate member is set larger than a distance between the third plate member and the second intermediate plate member.

23. The torque fluctuation absorbing apparatus according to claim 1, wherein the first plate member is disposed on a drive side, and the second plate member is disposed on a driven side.

24. The torque fluctuation absorbing apparatus according to claim 1, wherein the first plate member is disposed on a driven side, and the second plate member is disposed on a drive side.

25. The torque fluctuation absorbing apparatus according to claim 1, wherein the acting section comprises a taper.

26. The torque fluctuation absorbing apparatus according to claim 1, wherein the intermediate plate member has the acting section on one side surface thereof in the axial direction and the frictional sliding surface on an other side surface thereof in the axial direction.

27. The torque fluctuation absorbing apparatus according to claim 1, wherein the resilient member circumferentially contracts.

* * * * *